(12) United States Patent
Chandrasekaran (10) Patent No.: US 7,555,502 B2
(45) Date of Patent: Jun. 30, 2009

(54) DETECTING DATABASE EVENTS USING RECOVERY LOGS

(75) Inventor: Sashikanth Chandrasekaran, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 292 days.

(21) Appl. No.: 11/372,968

(22) Filed: Mar. 10, 2006

(65) Prior Publication Data
US 2007/0214191 A1   Sep. 13, 2007

(51) Int. Cl.
*G06F 12/00* (2006.01)
*G06F 17/30* (2006.01)

(52) U.S. Cl. ..................................... 707/202
(58) Field of Classification Search ................. 707/202
See application file for complete search history.

(56) References Cited

U.S. PATENT DOCUMENTS

| | | | |
|---|---|---|---|
| 6,353,835 B1 * | 3/2002 | Lieuwen ..................... | 707/203 |
| 6,427,146 B1 * | 7/2002 | Chu ............................. | 707/3 |
| 2005/0097149 A1 | 5/2005 | Vaitzblit et al. | |
| 2005/0289187 A1 | 12/2005 | Wong et al. | |
| 2006/0004794 A1 * | 1/2006 | Pizzo et al. ................. | 707/100 |
| 2006/0259518 A1 * | 11/2006 | Lomet et al. ................ | 707/201 |
| 2007/0130226 A1 * | 6/2007 | Banerjee et al. ............ | 707/204 |

OTHER PUBLICATIONS

Using LogMiner to Analyze Redo Log Files, Oracle 9i Database Administrator's Guide, published May 8, 2005, http://webarchive. org/web/20050508055130/http://www.cs.uvm.edu/oracle9doc/.*

Joris Mihaeli and Opher Etzion, Event Database Processing, IBM Haifa Research Lab, 2004.*

Manish Bhide, Ajay Gupta, Mukul Joshi and Mukesh Mohania, Optimal Deployment of Triggers for Detecting Events, IBM India Research Labratory, DEXA 2004, pp. 66-76.*

European Patent Office, "Notification of Transmittal of the International Search Report and the Written Opinion of the International Searching Authority, or the Declaration", international application No. PCT/US2007/005351, dated Jul. 26, 2007, 12 pages.

Claims, international application No. PCT/US2007/005351, 3 pages.

Prescott, William, "Database Triggers", Oracle, XP-002924136, 2001, 14 pages.

Snodgrass, Rick, "Temporal Support in Standard SQL", Database Programming & Design Online, DBPD: Temporal Support in Standard SQL, Retrieved from website: <http://www.dbpd.com/vault/9810snod.html>, Oct. 1998, 9 pages.

(Continued)

*Primary Examiner*—James Trujillo
*Assistant Examiner*—Jeffrey A Burke
(74) *Attorney, Agent, or Firm*—Hickman Palermo Truong & Becker LLP (57) ABSTRACT

A method and apparatus for determining when an event occurred in a database is provided. At least a portion of the database is restored to a point in time that is prior to the event. Recovery logs are translated to database operations (e.g., SQL) that are capable of causing the changes described in the recovery logs. A mechanism is created for detecting the event based on execution of the statements. For example, a database trigger is created to detect the event. The database operations are executed against the restored database to cause the mechanism to detect the event.

28 Claims, 4 Drawing Sheets

OTHER PUBLICATIONS

Chen, Kevin, et al., "ECF- Event Correlation For Forensics", 1st Australian Computer, Network & Information Forensics Conference 2003, XP-002441540, Retrieved from website: http://scissec.scis.ecu.edu.au/conference_proceedings/2003/forensics/pdf/11_final.pdf, dated Nov. 25, 2003, 10 pages.

Snodgrass, Richard T., "Developing Time-Oriented Database Applications in SQL," Morgan Kaufmann Publishers—2000, 504 pages.

Terry, Douglas et al., "Continuous Queries over Append Only Databases," ACM SIGMOND, Jun. 1992, pp. 321-330.

* cited by examiner

DETECTING DATABASE EVENTS USING RECOVERY LOGS

FIELD OF THE INVENTION

The present invention relates to database management systems. In particular, embodiments of the present invention relate to detecting events in a database using database recovery logs.

BACKGROUND

An important function of a database management system (DBMS) is to reconstruct a past sequence of events that occurred in a database either for forensic analysis or to satisfy regulatory requirements. Constructing such events may involve a (DBMS) responding to a temporal query. A temporal query is a query where results may only be computed from one (or more) previous database states. Consider a situation in which a DBMS tracks purchase orders and user roles. A user's role determines the user's authority to perform functions or actions in the database system, such as purchasing orders. At some point a salesman is incorrectly granted authority to approve purchase orders. For example, the salesman role that is stored in a table in the database is incorrectly changed to grant purchase order authority. The salesman then proceeds to approve purchase orders, wherein the DBMS records the purchase orders. At some point, later in time an auditor discovers that the salesman should not have been granted this authority. The auditor may cause the salesman's role to be changed to no longer allow purchase order approval, if this role change has not already been made. The auditor also needs to know all of the purchase orders approved by the salesman with incorrect authority. The information may not be available in the database, in its current state, because the records for the purchase order have been deleted or authorization information in the records has been overwritten to reflect purchase order approval by someone with legitimate authority. To determine what purchase orders were approved by the salesman, the auditor may wish to use a temporal query such as the following.

"Show me the all the purchase orders approved by John Doe during the time that he was a salesman."

The actual format for the temporal query may be different than the example. The start time for the example temporal query is when the salesman's role became "Salesman." The end time for the temporal query is when the salesman's role does not include "Salesman." Thus, the DBMS should return all purchase orders approved by the salesman between the start and end times.

There are other situations where there is a need for a DBMS to respond to temporal queries. For example, an operator may have incorrectly marked an item as "for sale." In this case, it is desirable to determine all sales of the item recorded by the DBMS that were made with the incorrect price.

Determining an answer for such temporal queries presents numerous challenges. Techniques such as consistent read, flashback query etc. are not viable solutions to the problem. A consistent read or flashback query executes a query as of a specific time in the past. However, the beginning and/or ending time that is pertinent for the temporal query may not be known. For example, using the example of the salesman, the hire date of the particular salesman and the time at which the problem was discovered may be known. However, the time at which the authority was incorrectly granted may not be known. Moreover, the time at which the authority was corrected may not be known.

Further, the response to the temporal query should provide all the results of interest between a start time and an end time. For example, all of the purchase orders that the salesman incorrectly granted are of interest. Therefore, techniques such as consistent read, flashback query etc. are not viable solutions to the problem.

Moreover, a point-in-time recovery of a database to a time in the past is not a viable solution. As previously discussed, the pertinent time may not be known. Also, a point-in-time recovery does not provide information over a range of times.

One conventional solution to the temporal query problem is for an application programmer to maintain a detailed trail of time-stamped changes within the application. For example, the programmer internally converts every update or delete statement to include a pre-processing or post-processing step which logs the before images of the data and a timestamp of when the change was made. This causes additional columns and rows to be created in the database that can be used to answer the temporal query.

Using the above example temporal query, there may be a roles table ("roles") that has an attribute "role name", which may have a value of "Salesman" indicating the individual with that role has purchase order authority. Moreover, an orders table ("orders") may have an attribute "approver_name" whose value indicates the individual who approved the order. In order to answer the temporal query, the application programmer can create two new columns, "when" and "when_deleted" in both tables. The programmer includes the current time in the "when" column as part of an update or an insert statement. Further, the programmer includes the current time in the "when_deleted" column when a row is deleted. (Alternatively, the programmer could change deletion of rows to insertion of a new row with a status column set to "DELETED.") These changes to the database allow the above example temporal query to be answered by issuing the following SQL statement:

select *
from orders o, roles r
where o.approver_name="John Doe" and r.name="John Doe" and
    r.role_name="Salesman" and o.when between r.when and
      r.when_deleted However, such conventional techniques have a number of drawbacks. An extraordinary burden is placed on the application programmer to extend the database schema and correctly maintain a trail of changes to database rows. Performance suffers because all changes are audited by the application. Further, the size of the database tables increases. One reason for the increase in size is that timestamp information cannot be deleted from the table, which means that rows cannot be deleted.

Rather than making the above changes to the application, another conventional approach is to create database triggers that execute code in the database backend to achieve a similar result. Richard T. Snodgrass describes such a method and other related issues in, "Developing Time Oriented Database Applications in SQL." However, creating database triggers suffers from similar problems as techniques that place a burden on the application programmer.

Many database applications enforce a unique constraint to a table. For example, the table is constrained such that a particular user can only have a single privilege. However, this prevents the database from having multiple rows for a particular user in the same table. Thus, the same table cannot be used to assign two different roles to John Doe, in the example.

A solution to the limitation of the table allowing only one role per user is to create a separate history table. This penalty can be mitigated by migrating "historical" rows to a different partition. However, the schema designer is still faced with the burden of partitioning the data.

Another solution to the limitation of the table allowing only one role per user is to change the constraints to add a timestamp, which is a difficult process. However, applying this constraint involves applying numerous rules, which are enforced by substantial modifications to SQL statements. The modifications to the SQL adds substantial overhead and complexity to the application or the DBMS, if such functionality is built-in to the DBMS.

The penalties associated with the foregoing techniques are incurred even though the temporal queries are issued infrequently. For example, the temporal queries may only occur as part of an investigation during an audit. Further, the query may be issued against a small subset of the database objects, whereas the penalty is incurred on changes to all objects.

Thus, there is a need for a DBMS to respond to temporal queries. There is a need for techniques that do not place a heavy burden on application programmers or that require substantial changes to the database backend. There is a further need for a technique that does not cause a severe performance penalty to normal operation of the database. There is a still further need for a technique that does not require substantial increase to the database size.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An embodiment of the present invention is a method for determining when an event occurred in a database. At least a portion of the database is restored to a point in time that is prior to the event. Recovery logs are translated to statements representing database operations (e.g., SQL statements) that are capable of causing changes described in the recovery logs. A mechanism is created for detecting the event based on execution of the statements. For example, a database trigger is created to detect the event. The statements are executed against the restored database to cause the mechanism to detect the event.

Another embodiment of the present invention is a method for responding to a temporal query. A user provides a temporal query having a begin event, an end event, and a query pertaining to the time between the begin and end events. The begin event can be detected in a manner similar to the embodiment discussed in the previous paragraph. A trigger event is generated to detect the end event and a mechanism is generated to determine results for the query block. For example, a materialized view is generated and populated by executing statements representing database operations (e.g., SQL) that are based on recovery logs. The temporal query is answered based on analysis of the information in the materialized view.

Example Temporal Query

In one embodiment, a response is provided for a temporal query to a DBMS. For illustrative purposes the following example temporal query is used. The user may want to know the answer to the following temporal query:

"Show me all the purchase orders approved by John Doe during the time that he was a salesman."

The actual format of the temporal query can be based on a format that is readily converted to database operations. For example, the temporal query can be based on SQL as with the following example. In general, the format of the temporal query is "BEGIN QUERY END." The BEGIN and END blocks specify the beginning and ending points. In general, the BEGIN and END blocks may be event specifications. In other words, the time is not specified. Special cases are discussed below, including examples in which a beginning or ending time is specified. In the example, the begin event is an update or an insert of a row in a database table which assigns the role "Salesman" to the user "John Doe." Therefore, the following BEGIN block is suitable to describe the event. A "begin event" is defined as when the condition in the BEGIN block evaluates to TRUE.

BEGIN is AFTER INSERT OR UPDATE OF roles

WHERE roles.name="John Doe" and roles.role_name="Salesman"

Continuing with this example, the END block reflects a database event that describes when John Doe no longer has the role of salesman. The following example END block specifies when an update or delete removes the role "Salesman" from user "John Doe." An "end event" is defined as when the condition in the END block evaluates to TRUE.

END is AFTER DELETE OR UPDATE OF roles

WHERE roles.name="John Doe" and roles.role_name="Salesman"

Continuing with the example, the following example QUERY block is suitable to answer the question of what sales were approved by John Doe.

```
select *
    from orders
        where approver_name = 'John Doe'
```

The temporal query may be answered by analyzing results of one or more queries based on the QUERY block, provided the query or queries are issued between the begin event and the end event. Herein, the one or more queries are referred to as the base query. While the BEGIN QUERY END blocks have a format that is similar to SQL, this is not a requirement.

Process Flow of Determining when a Database Event Occurred

Figure 1:
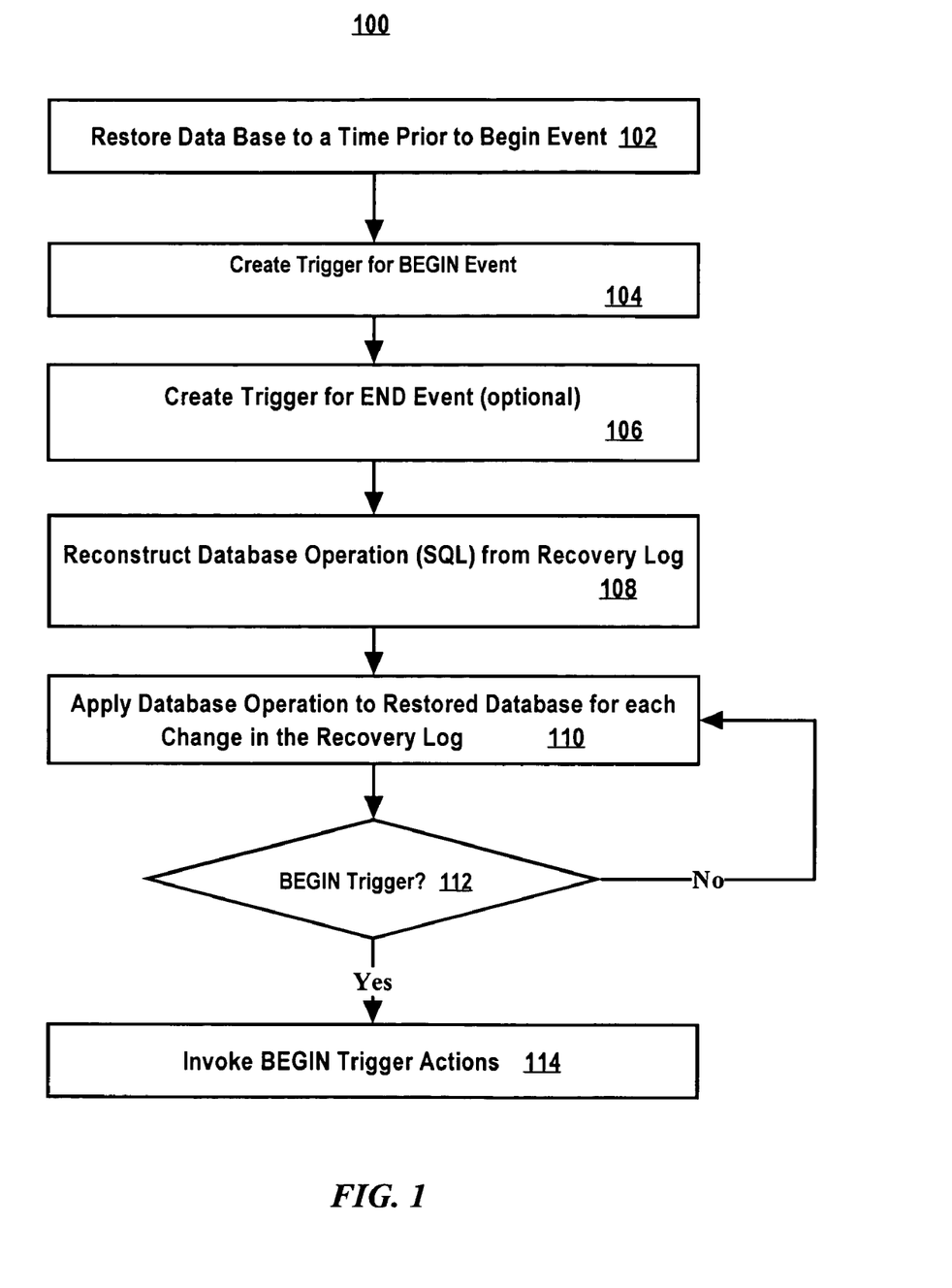
FIG. 1 is a flowchart that illustrates a process for detecting whether an event has occurred in the database, in accordance with an embodiment of the present invention.
Figure 2:
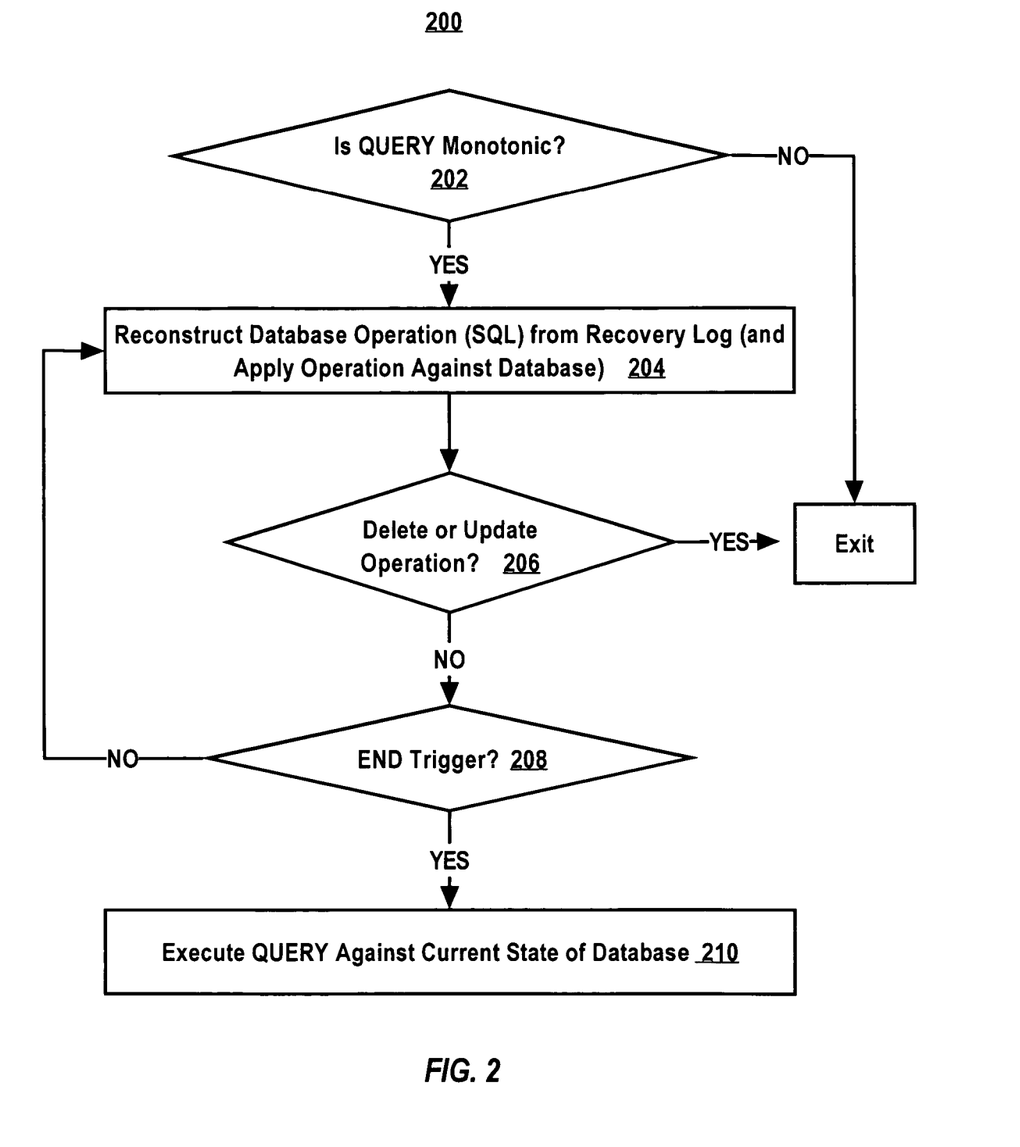
FIG. 2 is a flowchart illustrating steps of a process of providing a result for a temporal query, in accordance with an embodiment of the present invention.
Figure 3:
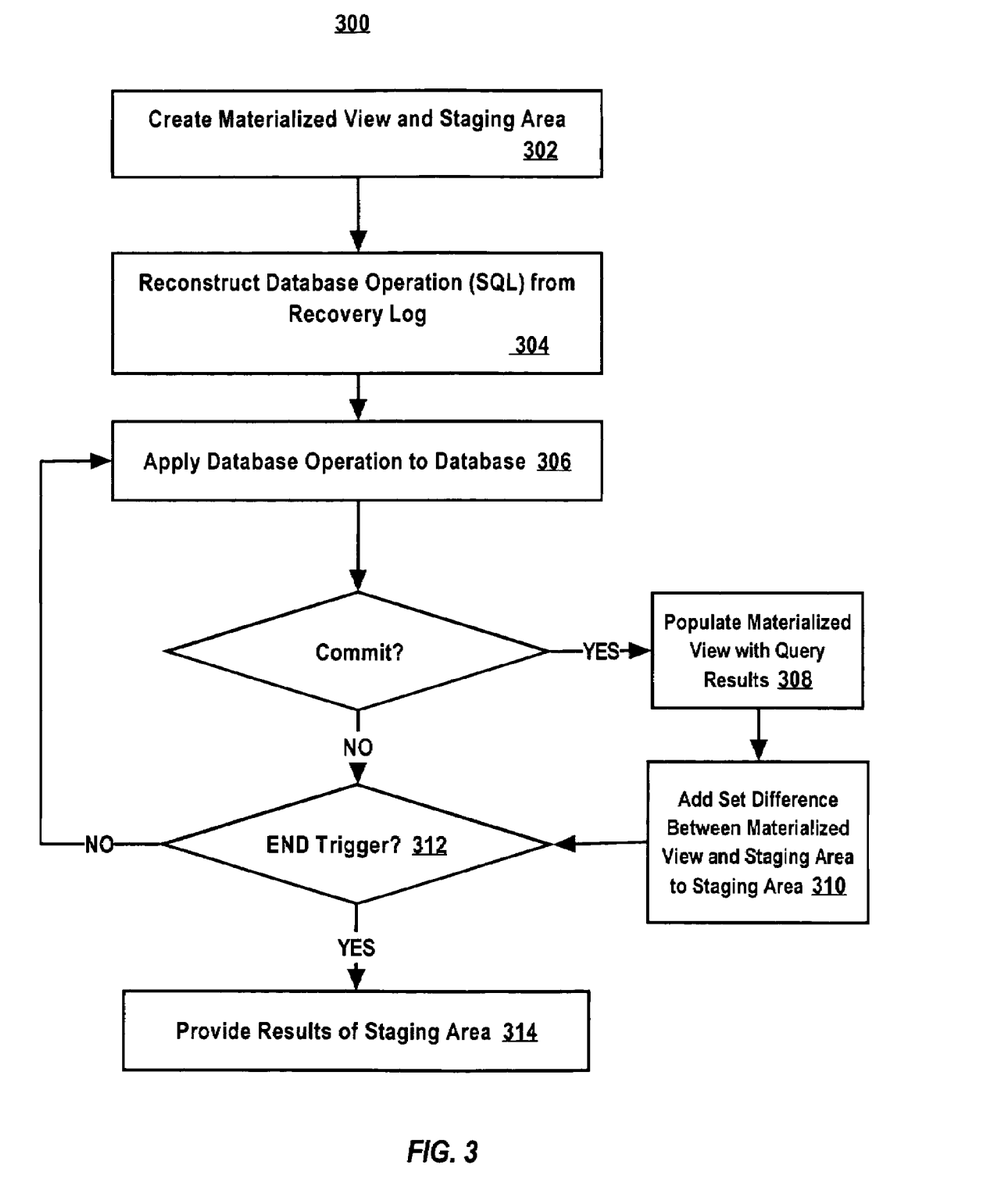
FIG. 3 is a flowchart illustrating steps of a process of providing results to a temporal query using materialized views, in accordance with an embodiment of the present invention.

FIG. 1 is a flowchart that illustrates a process 100 for detecting when an event occurred in a database. In one embodiment, process 100 is initiated in response to receiving a temporal query. Process 100 will be discussed by using the example in which the user desires to know what sales were approved by John Doe during the time in which John Doe was incorrectly given the role of purchase order approval authority. The above BEGIN and END blocks will be used to help illustrate process 100. Thus, process 100 can be used to determine when an event occurred, such as John Doe being given a role with purchase order approval authority. As previously discussed, the BEGIN block describes this condition. However, the event detected by process 100 is not limited to a beginning event of a temporal query. More generally, process 100 can be used to detect when any specified event took place in a database. Process 200 of FIG. 2 and process 300 of FIG. 3 provide details of determining an answer to a temporal query, such as what orders were approved by John Doe.

In step 102 of FIG. 1, at least a portion of the database is restored to a time prior to the event under investigation. In some cases, a suitable time can be assumed. If the event is the time at which John Doe was assigned a role of purchase order authority, a suitable time could be the hire date of John Doe. The oldest version of the database can be restored if a more recent time is not arrived at. It is not required that the entire database is restored. For example, in the salesman example the relevant information will be either the sales table or the roles table. Therefore, those tables are restored. Accessing the sales or roles tables may depend on other objects (dependent objects), such as indexes. Therefore, dependent objects may also need to be restored. As used herein, the term "dependent object" means any object that is used to facilitate accessing or manipulating another data object or to do so more efficiently. Further details of limiting the portion of the database that is restored are discussed below.

In step 104, one or more database triggers are created to detect a condition in the BEGIN block (the begin event). In a DBMS, a trigger is an object (e.g., a procedure) that specifies a series of actions to be automatically performed when a specific event occurs. The series of actions specified by a trigger is typically written as instructions in a high-level database language such as SQL or PL/SQL (a procedural language extension of SQL available from Oracle Corporation of Redwood Shores, Calif.). For example, in a relational database, triggers may be designed to fire when a row of a database table or a table view is updated, inserted, or deleted. Accordingly, a trigger is typically associated with a single database table. Using the salesman example, a relevant table is the roles table specified in the BEGIN block. Therefore, a database trigger can be created for the roles table. If the BEGIN block referenced multiple tables, a database trigger is created for each table.

A database trigger can be created for other tables. For example, the user may specify a wall-clock time in the BEGIN block, as opposed to specifying an event. Therefore, in the salesman example, there is not a trigger to set against the roles table. However, a trigger can be set for a table that has conversions between wall-clock time and a logical time kept by the DBMS. For example, a particular table may record the SCNs (System Change Numbers) or other logical time every 100 seconds or so of real or wall-clock time. This table does not necessarily have the exact wall-clock time for when each SQL statement was committed, but can provide a very close approximation. The trigger is set to determine when the wall-clock time is hit (or approximately hit).

The trigger can be optimized to specify that the trigger be executed only when columns specified in the BEGIN block are modified. In the salesman example, the columns in the BEGIN block are "name" and "role_name." In general, the trigger that is generated in step 104 can be any mechanism that will detect when the condition in the BEGIN block evaluates to TRUE.

The trigger is implemented to cause a desired action to take place upon detecting the condition in the BEGIN block. For example, the desired action may be determining a response to a temporal query. Implementing the database trigger is dependent on numerous factors as discussed below. The database trigger is implemented by examining the END block, in one embodiment. If it is known that the BEGIN block is equal to the END block, the body of the trigger may be implemented based on the QUERY block itself, in order to answer the temporal query. However, if there is a time range (END-BEGIN) during which the results of issuing one or more queries based on the QUERY block need to be computed, the body of the trigger may set a flag indicating that the begin event was detected. One example of using the flag is discussed in process 300 of FIG. 3, wherein the flag is used to trigger populating a materialized view.

In optional step 106, a trigger is created to detect a condition in the END block ("the end event"). Step 106 does not need to be performed if the end goal of process 100 is to determine the wall-clock time at which the begin event occurred. However, as process 100 can be used as a starting point for answering temporal queries, creating the end trigger allows determination of the pertinent range for the temporal query. The end trigger is implemented in accordance with the desired application and is discussed below.

In step 108, statements representing database operations are reconstructed from a recovery log of the database. In one embodiment, SQL statements are reconstructed from the recovery log. For example, Oracle LogMiner provided by Oracle Corporation of Redwood Shores, Calif. may be used to generate SQL from recovery logs. However, there is no requirement of using LogMiner.

The SQL statements that are reconstructed are not necessarily the same SQL statements that were used to make the database changes recorded in the logs. For example, there are many different SQL statements that could cause a particular change to a database and the recovery log information may not be able to determine the exact SQL statement that caused the change. However, the event can still be detected. As a particular example, many different SQL statements could assign the role of salesman to John Doe. However, process 100 can detect a change to the role of salesman to John Doe regardless of the SQL Statement that caused the change.

It is not required that statements representing database operations be reconstructed for all recovery logs associated with the database. For example, if process 100 is being used to detect the begin event for the example temporal query, then only recovery logs that belong to the set of objects in BEGIN block need to be processed. If process 100 is being used to detect the end event for the example temporal query, then recovery logs that belong to the set of objects in END block need to be processed. As previously discussed, process 100 is not limited to determining a begin event, but applies more generally to event detection. Thus, more generally, the only recovery logs for which database operations are reconstructed are logs belonging to objects associated with the event being detected. For example, database operations may be reconstructed for objects associated with the following: 1) a begin event, 2) an end event, 3) a QUERY block, 4) metadata, such as catalog objects and indexes used to detect the begin event, end event, and execution of the QUERY block.

In step 110, the database operations are applied to the reconstructed database in order to apply the changes to the database. As previously discussed, only relevant changes need be applied. For example, only changes related to the sales table, roles table or dependent objects are applied to the database.

If the BEGIN trigger fires in step 112, then in step 114 the trigger actions are applied as defined in the body of the trigger. As previously discussed, the trigger can perform a wide variety of actions. In one embodiment, the trigger actions determine and report when the event happened. For example, by correlating the SCN (system change number) with a wall-clock time, the time at which John Doe was granted authority to approve purchases is determined and reported. In another embodiment, in response to the begin trigger firing, a sequence of actions is taken to determine changes made to the database after the begin event up until another time. Thus, a temporal query can be answered. For example, the DBMS determines what purchase orders were approved by John Doe after Doe was granted purchase order authority up until the authority was removed.

Process Flows for Responding to a Temporal Query

After the begin event is detected, one or more queries based on the QUERY block are issued and the results are analyzed. The base query is executed against one or more versions of the database. The semantics of the base query and the version of the database against which the base query is executed depend on (a) the statement(s) in the QUERY block and (b) whether rows of the database were updated or deleted between the begin and end events.

The technique for responding to a temporal query depends, at least in part, on whether or not the base query is monotonic. For a query Qm, a monotonic query is one in which the result set of Qm(t1) is a subset of or equal to the result set of Qm(t2) for t2>t1. If the base query is monotonic and there are no row updates or deletes related to the temporal query, then a single base query can be executed against the version of the database at the time of the end event. That is, the changes in the recovery logs are applied to the restored database until the end event is triggered and the result of executing the QUERY block can be determined by executing the QUERY block at a single point in time—the end event. FIG. 2 describes an embodiment of the present invention for this first case.

Consider the example of determining what orders were approved by John Doe. The following base query can be issued at the end event using the following SQL statement.

```
select *
from orders
where approver_name = "John Doe"
```

The statement above will return all orders approved by John Doe. This provides an accurate result for the special case. However, if the base query is not monotonic or if there is a row update or delete, then the state of the database at the end event does not contain all of the information to answer the temporal query. For example, if a row was inserted when John Doe approved a purchase order, but then the row is updated due to modification of the order, the updated row does not contain the initial order information. FIG. 3 describes an embodiment of the present invention that uses materialized views to provide results for this more general case.

A) Monotonic Queries and No Database Deletes/Updates

FIG. 2 describes a process 200 of providing a result for a temporal query, in accordance with an embodiment of the present invention. The example temporal query regarding the salesman is used to facilitate explanation of process 200, but the process 200 is not limited to this example. The process 200 may be initiated in response to the BEGIN trigger firing in process 100; however, it is not required that process 100 be used to initiate process 200. Moreover, some of the steps of process 200 can be performed prior to the trigger firing. Process 200 may include some or all of the acts of the trigger itself, although this is not required.

In step 202, a determination is made as to whether or not the base query associated with the QUERY block is monotonic. If it is not monotonic, then the process 200 exits without providing a result. Step 202 may be performed prior to the trigger firing, if desired. Techniques are described for converting a non-monotonic query into a monotonic query. For example, the paper "Continuous Queries over Append-Only Databases" Terry et al. describes techniques for converting non-monotonic queries to monotonic queries. If the initial base query formed to respond to the user's temporal query is non-monotonic, it may be possible to covert the base query to a monotonic form. However, rather than converting the base query to a monotonic form, the process 200 can exit. If process 200 exits, then process 300 in FIG. 3 may be executed to provide a result.

If the base query is monotonic, then in step 204, database operations are reconstructed from the recovery log for the database. The only recovery logs that need to be processed are ones for objects related to the QUERY block, end event and other dependent objects such as catalog objects and indexes that are needed for executing the QUERY block or end event trigger. For example, the example QUERY block specifies the orders table; therefore, only recovery logs for the orders table, any indexes on the orders table, catalog objects and the roles table are processed.

Step 206 is a determination as to whether there is a delete or update to a row that is related to the base query. If so, the process 200 exits without providing a result for the temporal query. For example, if there is a delete or update to a row of the orders table with an approver name of John Doe, then the process exits. The process 300 in FIG. 3 may be executed to provide a result if process 200 exits with no result.

Process 200 continues, until the end trigger fires, to reconstruct more database operations and determine if a relevant delete or update occurred, in step 208. Thus, the end trigger only fires if the base query is monotonic and there are no relevant updates or deletes. If the end trigger fires, then the base query is executed against the database, in step 210. For example the following base query may be executed to determine what orders John Doe approved between the time Doe was granted authority and the authority was revoked:

```
select *
from orders
where approver_name = "John Doe"
```

B) General Case Using Materialized Views

FIG. 3 is a flowchart illustrating steps of a process 300 of providing results to a temporal query using materialized views, in accordance with an embodiment of the present invention. The example temporal query for the salesman is used to facilitate explanation of process 300, but the process 300 is not limited to this example. Process 300 can be performed if process 200 of FIG. 2 exits without providing a result to the temporal query, as previously discussed. However, process 300 can be performed without first performing process 200.

In step 302, a view and a staging area are created. A materialized view is a view for which a copy of the view data is stored separate from the base tables from which the data was originally gathered and derived. The data contained in a materialized view is referred to herein as ("materialized data"). Using a materialized view eliminates the need to repeatedly issue the base query.

The materialized view helps identify the subset of the result for the base query due to changes made between the begin and end events. The materialized view can be automatically populated as the recovery logs are reapplied to the database. However, other solutions may be used as well. Moreover, it is not required that the materialized views be automatically populated. The recovery logs are applied through the SQL layer, in one embodiment, such that the materialized views are automatically populated.

A materialized view is created based on the QUERY block. The materialized view has a Boolean column, in accordance with one embodiment. The Boolean column will store the time window during which a result row in the view satisfied the temporal query. Below is an example materialized view for the temporal query in the salesman example.

```
create view orders_view
as select FLAG, o.*
    from orders
    where approver_name = "John Doe"
```

In the example materialized view, "FLAG" is a global state variable that is set to 0 when orders_view is created. The FLAG is set to 1 after the BEGIN event is reached. The FLAG may be set by execution of the body of the BEGIN trigger.

Continuing with the explanation of step 302, a staging area is created for storing the results that will be returned to the user when the end event is reached. In the salesman example, the staging area will be empty initially because the salesman is presumed to not have approved any orders at the beginning point when approval authority was granted. Clearly, there could be cases in which the staging area is not empty at the beginning point depending on the specification of the temporal query.

The materialized view and staging area are described as separate objects for ease of exposition and to re-use implementation of materialized views. However, the same object can be used for both. For example, the materialized view can be augmented with status columns, wherein it can serve as the staging area. The code that populates the materialized view should be appropriately modified to handle the status columns.

In step 304, statements representing database operations are reconstructed from a recovery log of the database. In one embodiment, SQL statements are reconstructed from the recovery log. In other words, the recovery is a logical application at the SQL layer rather than a physical application at the block level.

The statements representing database operations are applied to the database in step 306. Whenever a commit operation occurs, the materialized view is automatically populated, in step 308.

As previously discussed, process 300 is adapted to handle situations in which there are delete and update operations and/or the base query is non-monotonic. Step 310 is used to handle these conditions. In step 310, the set difference between the rows in the result staging area and the materialized view is added to the staging area. Any rows found in the materialized view but not in the staging area are copied to the staging area. Using the salesman example, the staging area is empty at the very moment the salesman is granted authority to approve orders. Therefore, a row appearing in the materialized view but not in the staging area indicates that the salesman approved an order after being granted such authority.

Any rows found in the staging area but not in the materialized view are retained in the staging area with a status flag set to DELETED. Using the salesman example, a row appearing in the staging area but not in the materialized view may indicate that an order approved by the salesman was later processed and the row was later deleted because the order processing is complete. Because this is relevant to the temporal query, such information should be returned to the user. In effect, modifying the staging area results in a temporal table for the duration that is of interest to the user.

Process 300 continues to evaluate more recovery logs until the end trigger is reached in step 312. Then control passes to step 314, wherein the results located in the staging area are returned to the user. Process 300 then ends.

Alternative Embodiment without Using Materialized Views

It is not required that the view created in step 302 of process 300 be a materialized view. Rather than using materialized views, the base query specified in the QUERY block can be directly executed. In order for the base query to only return rows that are modified after the begin event, the base query is executed immediately after the begin event is triggered and the results are saved in a separate table. Thereafter, the redo logs are processed and after every COMMIT, the base query is directly executed, and the set of rows saved in the previous step are removed from the result set of the base query. This set of rows constitutes the rows that would have been incrementally populated by the materialized view mechanism. In this method, the functionality of the materialized view is simulated by reexecuting the QUERY block after every COMMIT operation.

After executing the base query, the base query results are compared against the staging area to compute a set difference, which is added to the staging area in a similar manner as step 310 of process 300.

Limiting What Portions of the Database are Restored

As previously discussed, it is not required that all portions of the database are restored prior to applying recovery logs thereto. In general, the BEGIN, QUERY and END blocks are analyzed to determine the set of tables and dependent objects that need to be restored. In the salesman example, only the orders and roles tables need to be restored. However, any dependent objects such as indexes that may be used to evaluate the BEGIN, QUERY and END blocks also should be restored. Further, all catalog or dictionary objects that are required for compiling and executing the BEGIN, QUERY and END blocks are also restored. In most database systems, the catalog or dictionary objects belong to a special schema, such as the Oracle SYSTEM or SYS schema and can be easily identified.

One or more conditions should be satisfied in order to restore only a subset of the database. A first condition is that the database should allow restoring a subset of the tables. A second condition is that the statements representing database operations (e.g., SQL) that are generated from the recovery logs refers to column values within a single table. In other words, the general SQL statement should not refer to multiple tables. However, it is possible that the SQL statement that originally caused the change did refer to multiple tables.

To illustrate the type of recovery that generates SQL statements that refers to a single table, consider the following simple SQL statement issued during normal run-time:

insert into order (myseq.nextval, . . . )

In the above SQL statement, "myseq" is a SEQUENCE variable. During recovery, the redo logs are mined and the following SQL statement is generated:

insert into orders(500, . . . )

Note that the SQL statement generated during recovery does not depend on "myseq." Thus, even though the SQL statement issued during forward progress depends on "myseq," the SQL issued during recovery does not.

As another example, consider a case in which the SQL statement issued during forward progress references a side table in order to update the orders table. In this case, the SQL generated during recovery may not involve the side table. For example, the following SQL statement, which references the side table "emp", is issued during forward progress.

insert into roles
(select username
from emp
where empid=100), "approver"

During forward progress, the SQL statement causes the table "emp" to be accessed in order to update the roles table. In particular, the value "John Doe" may be accessed from the emp table. However, the SQL that is generated during the recovery process would not reference the "emp" table. For example, the following SQL might be generated during recovery, which will have the same effect as the SQL that was used during forward progress.

insert into roles
("John Doe", "Approver")

Special Cases for Temporal Queries

The temporal query issued by the user will not always specify a begin event and an end event. For example, the user may assign a wall-clock time to the BEGIN block or END block, instead of defining them as occurrence of events (i.e. a condition becomes TRUE). The nature of the database trigger may depend on the way the user specifies the begin and end events, as previously discussed in step 104 of FIG. 1.

Another case is that user may not provide any information at all about either the begin or end event. If the user does not specify a begin event, the database can be restored to the beginning of time or some practical start time. If an end event is not specified, the end event can default to the current time or another practical end time.

Another case is that the user may only wish to determine when a certain change was made. In this case, the begin event equals the end event and the result of answering the temporal query is a value (e.g. a SCN or Log Sequence number) which can be correlated to wall-clock time using other database information.

Another case is that the user may wish to execute a point-in-time query when a certain change was made. For example, if a column was incorrectly updated, the temporal query may request the most recent value before the incorrect update. Or, the temporal query may request some other database state at the time that the specified change was made. In this case, a query based on the QUERY block will be executed just before the changes described by the BEGIN block are applied to the database. In this case, the body of the trigger executed on encountering the begin event may be the QUERY block itself.

Hardware Overview

Figure 4:
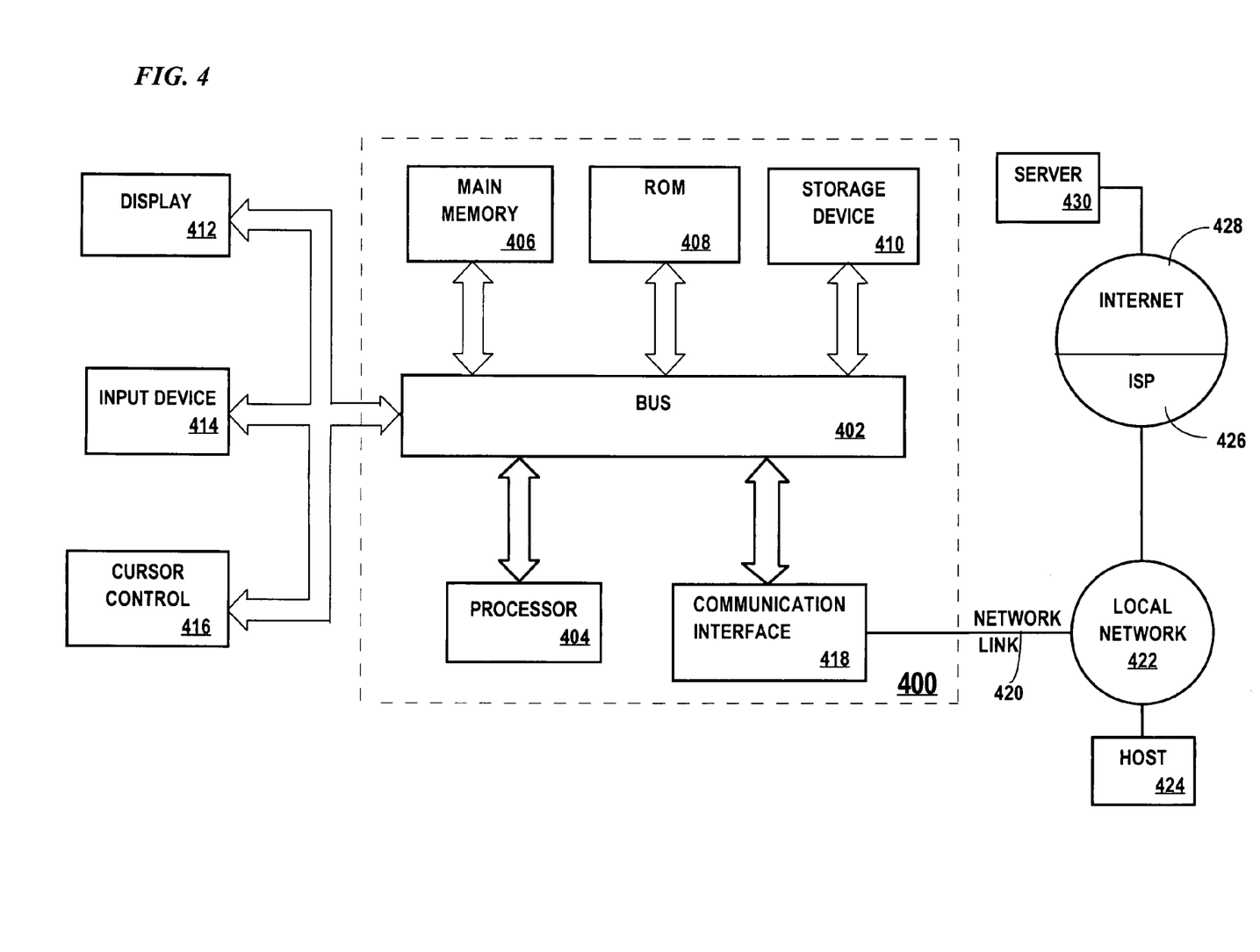
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method that detects occurrence of an event in a database, comprising:
   restoring a copy of at least a portion of the database to a point prior to the occurrence of a beginning event of a temporal query;
   translating redo log records that describe changes to the database into statements that reflect database operations that are capable of causing the changes to the database;
   generating a first database trigger for detecting the beginning event based on execution of the statements; and
   causing the first database trigger to detect the beginning event by executing the statements;
   generating a second database trigger for detecting an end event of the temporal query based on execution of the statements;
   accessing a base query that is based on the temporal query;
   after the first database trigger detects the beginning event, performing the following:
      causing the second database trigger to detect the end event by executing the statements; and
      in response to the second database trigger detecting the end event, issuing the base query to determine a response to the temporal query, wherein results of the base query provide a response to the temporal query;
   wherein the steps of restoring, translating, and issuing are performed on one or more computing devices.

2. The method of claim 1, wherein the statements are compliant with SQL.

3. A machine-readable storage medium storing instructions which, when executed by one or more processors, cause the one or more processors to perform the method recited in claim 2.

4. The method of claim 1, further comprising:
determining that there are no updates or deletes to the database object between the beginning event and the end event as a condition to issuing the base query to determine a response to the temporal query.

5. A machine-readable storage medium storing instructions which, when executed by one or more processors, cause the one or more processors to perform the method recited in claim 4.

6. The method of claim 1, further comprising:
determining that the base query is monotonic as a condition to issuing the base query to determine a response to the temporal query.

7. A machine-readable storage medium storing instructions which, when executed by one or more processors, cause the one or more processors to perform the method recited in claim 6.

8. A machine-readable storage medium storing instructions which, when executed by one or more processors, cause the one or more processors to perform the method recited in claim 1.

9. The method of claim 1, further comprising:
after the first database trigger detects the beginning event and before the second database trigger detects the end event, determining whether there is a delete or update to a row that is related to the base query.

10. A machine-readable storage medium storing instructions which, when executed by one or more processors, cause the one or more processors to perform the method recited in claim 9.

11. The method of claim 1, wherein the temporal query does not specify at least one of the beginning event or the end event.

12. A machine-readable storage medium storing instructions which, when executed by one or more processors, cause the one or more processors to perform the method recited in claim 11.

13. The method of claim 1, further comprising analyzing the temporal query to determine a set of database objects that are to be restored, wherein:
the set of database objects are less than all of the database objects stored in the database; and
restoring a copy of at least a portion of the database comprises restoring a copy of only the set of database objects.

14. A machine-readable storage medium storing instructions which, when executed by one or more processors, cause the one or more processors to perform the method recited in claim 13.

15. A computer-implemented method that detects occurrence of an event in a database, the method comprising the steps of:
restoring a copy of at least a portion of the database to a point prior to the occurrence of a beginning event of a temporal query;
translating redo log records that describe changes to the database into statements that reflect database operations that are capable of causing the changes to the database;
generating a first database trigger for detecting the beginning event based on execution of the statements;
causing the first database trigger to detect the beginning event by executing the statements;
generating a second database trigger for detecting an end event of the temporal query based on execution of the statements;
after detecting the beginning event, performing the following:
activating a view based on the temporal query;
executing a set of the statements, wherein the set of the statements reflect database operations that are capable of causing the changes to the database which occurred after the beginning event;
analyzing changes to data in the view as the set of the statements are executed to determine a response to the temporal query; and
in response to the second database trigger detecting the end event, providing the response to the temporal query;
wherein the steps of restoring, translating, and activating are performed on one or more computing devices.

16. The method of claim 15, wherein the view is a materialized view.

17. A machine-readable storage medium storing instructions which, when executed by one or more processors, cause the one or more processors to perform the method recited in claim 16.

18. The method of claim 15, further comprising comparing current data in the view with previous data in the view to determine changes made to the database object.

19. A machine-readable storage medium storing instructions which, when executed by one or more processors, cause the one or more processors to perform the method recited in claim 18.

20. The method of claim 15, wherein the first database trigger activates the view.

21. A machine-readable storage medium storing instructions which, when executed by one or more processors, cause the one or more processors to perform the method recited in claim 20.

22. A machine-readable storage medium storing instructions which, when executed by one or more processors, cause the one or more processors to perform the method recited in claim 15.

23. The method of claim 15, further comprising determining that a base query of the temporal query is monotonic as a condition to activating the view.

24. A machine-readable storage medium storing instructions which, when executed by one or more processors, cause the one or more processors to perform the method recited in claim 23.

25. The method of claim 15, wherein the temporal query does not specify at least one of the beginning event or the end event.

26. A machine-readable storage medium storing instructions which, when executed by one or more processors, cause the one or more processors to perform the method recited in claim 25.

27. The method of claim 15, further comprising analyzing the temporal query to determine a set of database objects that are to be restored, wherein:
the set of database objects are less than all of the database objects stored in the database; and
restoring a copy of at least a portion of the database comprises restoring a copy of only the set of database objects.

28. A machine-readable storage medium storing instructions which, when executed by one or more processors, cause the one or more processors to perform the method recited in claim 27.

* * * * *

UNITED STATES PATENT AND TRADEMARK OFFICE
CERTIFICATE OF CORRECTION

PATENT NO. : 7,555,502 B2 Page 1 of 1
APPLICATION NO. : 11/372968
DATED : June 30, 2009
INVENTOR(S) : Sashikanth Chandrasekaran It is certified that error appears in the above-identified patent and that said Letters Patent is hereby corrected as shown below:

On Title page, in Item (56), in column 2, under "Other Publications", line 6, delete "Labratory," and insert -- Laboratory, --, therefor.

Signed and Sealed this

Thirteenth Day of July, 2010

David J. Kappos
*Director of the United States Patent and Trademark Office*